3,065,257
Patented Nov. 20, 1962

3,065,257
ISOMERIZATION PROCESS FOR CONVERTING PHOSPHATE TRIESTER COMPOUNDS TO MORE INSECTICIDALLY ACTIVE ISOMERS
Jay A. Erikson, Alan R. Stiles, and Charles H. Tieman, Modesto, Calif., assignors to Shell Oil Company, New York, N.Y., a corporation of Delaware
No Drawing. Filed Mar. 6, 1961, Ser. No. 93,337
3 Claims. (Cl. 260—461)

This invention relates to a process for the preparation of a highly effective insecticide. More particularly, this invention relates to a process for the preparation of the insecticidally more active isomeric form of 2-carbomethoxy-1-methylvinyl dimethyl phosphate.

The compound 2-carbomethoxy-1-methylvinyl dimethyl phosphate is a highly effective insecticide, now sold commercially under the registered trademark, Phosdrin® Insecticide. It has been found that one of the isomers in which it exists is a markedly more active insecticide than is the other. The two isomers are geometric isomers, one having a cis crotonate configuration, and the other a trans-crotonate configuration, of the respective structures represented by the following formulae:

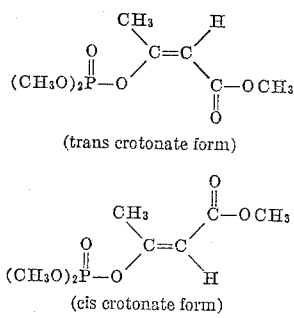

(trans crotonate form)

(cis crotonate form)

The evidence available indicates that the insecticidally more active isomer is the isomer having the cis configuration, while the less active isomer, of course, has the trans configuration.

It has been found that a mixture of the two isomers is formed when the compound is prepared in the usual manner, by the reaction of trimethyl phosphite with methyl alpha-chloroacetoacetate. Because of its higher insecticidal activity, the cis isomer of course is preferred, so that it is highly desirable that there be available some method for converting the trans to the cis isomer.

It now has been found that the trans isomer of 2-carbomethoxy-1-methylvinyl dimethyl phosphate can be converted to the cis isomer by bringing the trans isomer into contact with an acid. The acid apparently acts as a catalyst for the transformation of the trans isomer to the cis isomer, and consequently but catalytic amounts of the acid are ordinarily required. From the number and classes of acids which have been investigated, the transformation is catalyzed by acids generally.

Suitable classes of acids which can be mentioned, as illustrative, include the protonic acids, especially those having a dissociation constant of at least $10^{-2}$, the aprotonic Lewis acids, and the solid materials having substantial intrinsic acidity. Lewis acids are those substances that can accept a pair of electrons from another chemical substance to form a chemical bond. Thus, proton donors, such as hydrochloric acid and other compounds which dissociate to give hydrogen ion in water, are acids, and so also are compounds which are electron deficient but which do not furnish protons, an example being boron trifluoride. The acids which donate protons thus are denoted as protonic acids, while those which are electron deficient and do not donate protons are denoted as aprotonic acids. Typical examples of protonic acids include the strong mineral acids, such as hydrochloric acid, sulfuric acid, and the like, and organic acids such as alkanesulfonic acids, benzenesulfonic acid, and the like. Typical aprotonic Lewis acids include borontrifluoride already mentioned; oxyhalides of sulfur such as thionyl chloride and sulfuryl chloride; phosphorus pentoxide, sulfur dioxide, sulfur trioxide, metal salts, and the like. Most convenient in many cases for the purpose of this invention is borontrifluoride, as its etherate.

By solid materials having substantial intrinsic acidity is meant solid materials which in and of themselves are capable of acting like acids. Not included in the class are solid materials which are or may be acidic because of the presence of an acid, such as a mineral acid, sorbed on the surfaces thereof. This is not to say that solid materials containing an acid sorbed on the surfaces thereof are not suitable for the purposes of this invention, for such solid-sorbed acid combinations are quite suitable in the isomerization of the trans isomer of 2-carbomethoxy-1-methylvinyl dimethyl phosphate. The distinction between the two classes of solid acidic materials is pointed out merely to establish the fact that in the one case the acid properties are due to the presence of a sorbed protonic acid, whereas in the other case, the acid properties are the result of the presence of acid sites in or on the solid itself, these acid sites being a property of the solid itself, and not to an extraneous material present in combination therewth.

The intrinsic acidity of an acid can be expressed in terms of an acidity function, usually designated $H_0$. See Hammett, "Physical Organic Chemistry," McGraw-Hill, 1940, pages 266 et seq., and Hine, "Physical Organic Chemistry," McGraw-Hill, 1956, pages 59–61. The intrinsic acidity is usually expressed by a numerical value given by the equation:

$$\text{Intrinsic acidity} = H_0 = pK_A = pK_{BH^+} + \log \frac{(C_B)}{(C_{BH^+})}$$

in which $pK_{BH^+}$ is the acid ionization constant for the conjugate acid $BH^+$ of a neutral base (i.e., proton acceptor) B, $C_B$ is the centration of the base, B, and $C_{BH^+}$ is the concentration of the conjugate acid, $BH^+$, referred to dilute aqueous solutions. It will be seen that the intrinsic acidity of an acid is numerically equal to the acid ionization constant for the conjugate acid of the neutral base when one-half is in the form of the conjugate acid $BH^+$ and one-half is in the form of the base B.

It has been found that the numerical value for the intrinsic acidity of a solid material can be determined through the use of a neutral base of suitable basicity which shows a visible change of color upon neutralization with the acidic solid material. Thus, the numerical value for the intrinsic acidity of a given material can be determined by applying to it a small amount of a solution in an organic solvent of an indicator having a previously determined $pK_A$ value and observing the color of the solid containing the adsorbed indicator compound. This technique for determining the intrinsic acidity of a solid material is described generally in Hammett, supra, beginning at page 271, and both the theoretical basis for the use of the technique, and a detailed description of the technique is given in United States Patent No. 2,868,688. The pertinent disclosures of this patent relating to the meaning and determination of the intrinsic acidity of a solid material, are hereby specifically incorporated into and made a part of this description of this invention.

Because of their high activity, the preferred catalysts are the solid materials having intrinsic acidity corresponding to a value of less than about 2.0. It has also been found that the higher the intrinsic acidity of a material, i.e., the lower (more negative) its value, the better catalyst that material will be. Consequently it is preferred that the intrinsic acidity of the solid material used as catalyst correspond to a value of less than about 0.0.

Typical, readily available solid acids of this type are the natural and synthetic hydrocarbon cracking catalysts such as silica/alumina composite gels and the acid forms of cation exchange resins. Of course, other solid acids are available, and can be used.

The suitable cation exchange materials are those which are in the hydrogen, or acid, form. Such materials are well known in the art, being summarized and generically described at least in such standard reference works as: Boundy and Boyer, "Styrene," American Chemical Society Monograph No. 115, Reinhold, 1952, at pages 674–677, and in the references cited therein, and in: Kunin and Myers, "Ion Exchange Resins," Wiley, 1950, pages 54–55, and in the references cited therein. These references teach not only the nature of this class of materials, but also set out in detail methods for preparing them. These resins can be generically defined as synthetic aryl resins possessing an essentially hydrocarbon basic structure, combined with acid groups. (See U.S. Patent No. 2,678,332; also Kunin and Myers, supra.) Other suitable resins are described in U.S. Patent No. 2,561,254. The acidic groups generally consist of one or more of the sulfonic ($-SO_3H$), methylenesulfonic ($-CH_2SO_3H$), carboxylic ($-COOH$), phosphonic ($-P(O)(OH)_2$), and phosphonous ($-P(OH)_2$) acid groups. They are directly attached to the carbon structure of the resin. Resins of the sulfonic acid type in which the sulfonic acid groups are directly attached to an aromatic ring of a hydrocarbon resin structure are generally preferable. Examples thereof are the sulfonated polymers of polyvinyl aryl compounds, such as divinyl benzene; and the sulfonated copolymers of such polyvinyl aryl compounds with monovinyl aryl compounds, such as styrene. This type of resin is described in detail in U.S. Patent No. 2,813,908. That patent describes the preparation of such resins and the conversion thereof to the acid form. In some cases, it may be found desirable that the resin used be only partially in the acid form, the remainder of the acid sites thereof forming a salt or salts with other cations, such as various metals, and the like. U.S. Patent No. 2,861,045 teaches a method for the preparation of such partly metal modified ion exchange resins, which modified resins are quite suitable for the present purpose.

The clay-type cracking catalysts are, of course, a well-known class of materials, generically defined as inorganic solid materials involving one or more compounds which are ordinarily found in, or associated with, clays, and having a substantial intrinsic acidity. Generally these materials are defined in the first chapter of Emmett, "Catalysis. Volume II. Fundamental Principles (Part II)," Reinhold, 1955, and in such patents as Bennett et al., U.S. 2,564,388 and Montgomery et al., U.S. 2,400,431. As used herein, the term "Clay-type cracking catalyst" is given its broadest meaning—that is, it may be considered equivalent to the term "activated clay-type material"—and includes within its meaning any material, natural or synthetic, which has the properties commonly associated with clays, clayey materials and/or the ceramic materials resulting from sintering, calcining or otherwise heat treating natural clays or clayey materials, or synthetic mixtures of silica (usually in the form of a gel) and alumina, magnesia, zirconia or other compounds ordinarily associated with clays, which are "activated"—that is, which have an acidic surface. While, as pointed out in U.S. Patent No. 2,407,918, the term "clay-type cracking catalyst" ordinarily includes activated forms of silica, alone, and activated forms of alumina, alone, it is emphasized that activated forms of silica and alumina are intended to be within the scope and purview of the term "clay-type cracking catalysts," as used herein, and are suitable in the method of this invention. The preferred natural clays are the activated forms of the kaolinite clays, such as kaolinite, nacrite, dickite and anauxite, the attapulgite clays, such as attapulgite and sepiolite, the montmorillonite clays, such as montmorillonite, saponite, montronite and beidelite, halloysite, activated forms of talc, mica and pyrophyllites, the zeolites, and the like. The commercially available synthetic clay-type cracking catalysts also are preferred, and include the various combinations chosen from silica, alumina, zirconia, boria, titania, and/or magnesia, the combinations of silica and alumina being of most interest.

The isomerization of the trans isomer is effected by simply contacting the isomer with the catalyst. The substantially pure trans isomer can be used—that is, the trans isomer can be separated from the mixture of the two isomers ordinarily resulting in the preparation of 2-carbomethoxy-1-methylvinyl dimethyl phosphate—or the cis isomer can be present, as in the mixture of the two isomers.

But a small amount of catalyst, relative to the amount of the trans isomer to be converted, is ordinarily required, although larger amounts may be used. In homogeneous reaction mixtures—as where the catalyst is soluble in the phosphate and/or a suitable solvent is used—as little as 0.01 mole of catalyst per mole of phosphate is often suitable. Ordinarily, however, to conduct the reaction most efficiently, it is desirable that somewhat greater concentration of catalyst be used—say, from about 0.1 to about 0.3 mole of catalyst per mole of phosphate. While greater concentrations of catalyst can be used in some cases to advantage, in general, greater concentrations of catalyst will lead to little advantage, and in some cases may be undesirable because of the possibility of side reactions to produce undesirable by-products.

Where a heterogeneous reaction mixture is involved—as where an insoluble and/or solid catalyst such as an exchange resin is used—it may be desirable to use greater quantities of catalyst. Thus, relatively small quantities of catalyst are ordinarily used best where the catalyst reaction mixture is stirred or agitated in a vessel, while greater quantities of catalyst are best used where the phosphate or its solution is passed over or through a bed of the catalyst.

If desired, particularly when using a solid catalyst, a solvent can be used. Suitable solvents are those liquids which are substantially inert in the reaction system and which readily dissolve the phosphate. Suitable solvents are the lower halogenated alkanes, such as methylene chloride, carbon tetrachloride, and the like. Undoubtedly, other solvents of similar properties are quite suitable. The concentration of the phosphate in the solvent is not known to be a critical factor. In general, sufficient solvent should be used to completely dissolve the phosphate and to form a readily fluid reaction mixture, but the phosphate concentration should not be so low as to reduce the reaction rate to an undesirably low level.

The isomerization preferably is conducted at slightly elevated temperatures, for example, temperatures of from about 40° C. to about 100° C. being suitable and convenient. Use of temperatures much in excess of 100° C. is usually unnecessary, and usually is to be avoided to minimize the possibility of decomposition of the phosphate.

The isomerization is ordinarily conducted at rather low rates—in general, it has been found best to accept slow reaction rates in order to use lower temperatures.

The use of the method of this invention is illustrated by the following examples showing its use in particular instances. In these examples, p.b.w. means parts by weight and p.b.v. means parts by volume, parts by weight bearing the same relationship to parts by volume as does the kilogram to the liter.

EXAMPLE I

A mixture of 22.4 p.b.w. of 2-carbomethoxy-1-methylvinyl dimethyl phosphate, of which 90% was the trans isomer and 10% was the cis isomer, and 2.0 p.b.v. of boron trifluoride etherate was heated at 70° C. for 18 hours. The cooled product was then diluted with 100 p.b.v. of methylene chloride, washed with two 25 p.b.v. portions of a 5% sodium bicarbonate solution, and dried with sodium sulfate, and then the solvent was evaporated. 21.3 p.b.w. of the phosphate were recovered. The product was shown by infrared spectrum analysis to contain 62% cis isomer and 22% trans isomer.

EXAMPLE II

A mixture of 50 p.b.w. of the trans isomer of 2-carbomethoxy-1-methylvinyl dimethyl phosphate and 4.6 p.b.w. of sulfur trioxide was heated at 70° C. for 6 hours. The infrared spectrum analysis of the product showed the presence of 50% of the cis isomer.

EXAMPLE III

A mixture of 50 p.b.w. of the trans isomer of 2-carbomethoxy-1-methylvinyl dimethyl phosphate and 8.4 p.b.w. of mercuric acetate was heated at 70° C. for 36 hours. Infrared spectrum analysis of the product showed the presence of 30% of the cis isomer.

EXAMPLE IV

Approximately 1 p.b.w. of a dry sulfonated resin sold under the tradename Amberlite IR 120, which had been washed to remove all free acidity but none of the acidic exchange activity, was added to approximately 10 p.b.v. of the trans isomer of 2-carbomethoxy-1-methylvinyl dimethyl phosphate. Aliquots were taken at various intervals as the temperature of the mixture was raised from 25° C. to 105° C. Infrared spectrum analysis of these aliquots showed a conversion of 60% of the trans isomer to the cis isomer.

EXAMPLE V

A powder form of a zeolite molecular sieve sold commercially under the tradename Linde molecular sieve, type 4A, was allowed to stand in sulfuric acid for 5 minutes, then was washed with anhydrous ether, heated at 90° C. for 16 hours in a vacuum oven at 4 millimeter mercury pressure and cooled in a vacuum desiccator. The trans isomer of 2-carbomethoxy-1-methylvinyl dimethyl phosphate was contacted with the resulting solid which had a high intrinsic acidity. Conversion of the trans isomer to the cis isomer occurred to the extent of about 10%.

EXAMPLE VI

The experiment reported in Example IV was repeated, resulting in a product which contained 77% cis isomer and 23% trans isomer.

EXAMPLE VII

In a series of experiments, the trans isomer of 2-carbomethoxy-1-methylvinyl dimethyl phosphate was dissolved in carbon tetrachloride as solvent, and contacted with portions of the ion exchange resin of Example IV. In one experiment 10 p.b.w. of the trans isomer was dissolved in 250 p.b.v. of carbon tetrachloride, 2 p.b.w. of the resin was mixed with the solution and the mixture was refluxed (80° C.) for 18 hours. The product contained 23% cis isomer. In another experiment, 10 p.b.w. of the trans isomer was dissolved in 20 p.b.w. carbon tetrachloride, the solution was mixed with 2 p.b.w. resin, and the mixture was placed in a glass bomb. The bomb was held at 72° C. for 22 hours, the bomb and its contents being occasionally shaken by hand. The product contained 69% cis isomer. In other experiments, chloroform was substituted for the carbon tetrachloride. Because of the lower boiling point of chloroform, lower temperatures were used. Results equivalent to those obtained when carbon tetrachloride was used were obtained by using longer reaction times.

We claim as our invention:

1. A method for converting the trans isomer of 2-carbomethoxy-1-methylvinyl dimethyl phosphate to the cis isomer which comprises bringing said trans isomer into contact with an acid other than an oxidizing acid, as catalyst, at a temperature of up to about 100° C.

2. A method for converting the trans isomer of 2-carbomethoxy-1-methylvinyl dimethyl phosphate to the cis isomer which comprises bringing said trans isomer into contact with boron trifluoride etherate.

3. A method for converting the trans isomer of 2-carbomethoxy-1-methylvinyl dimethyl phosphate to the cis isomer which comprises bringing said trans isomer into contact with a cation exchange resin at least partially in the acid form.

No references cited.